Figure 1:
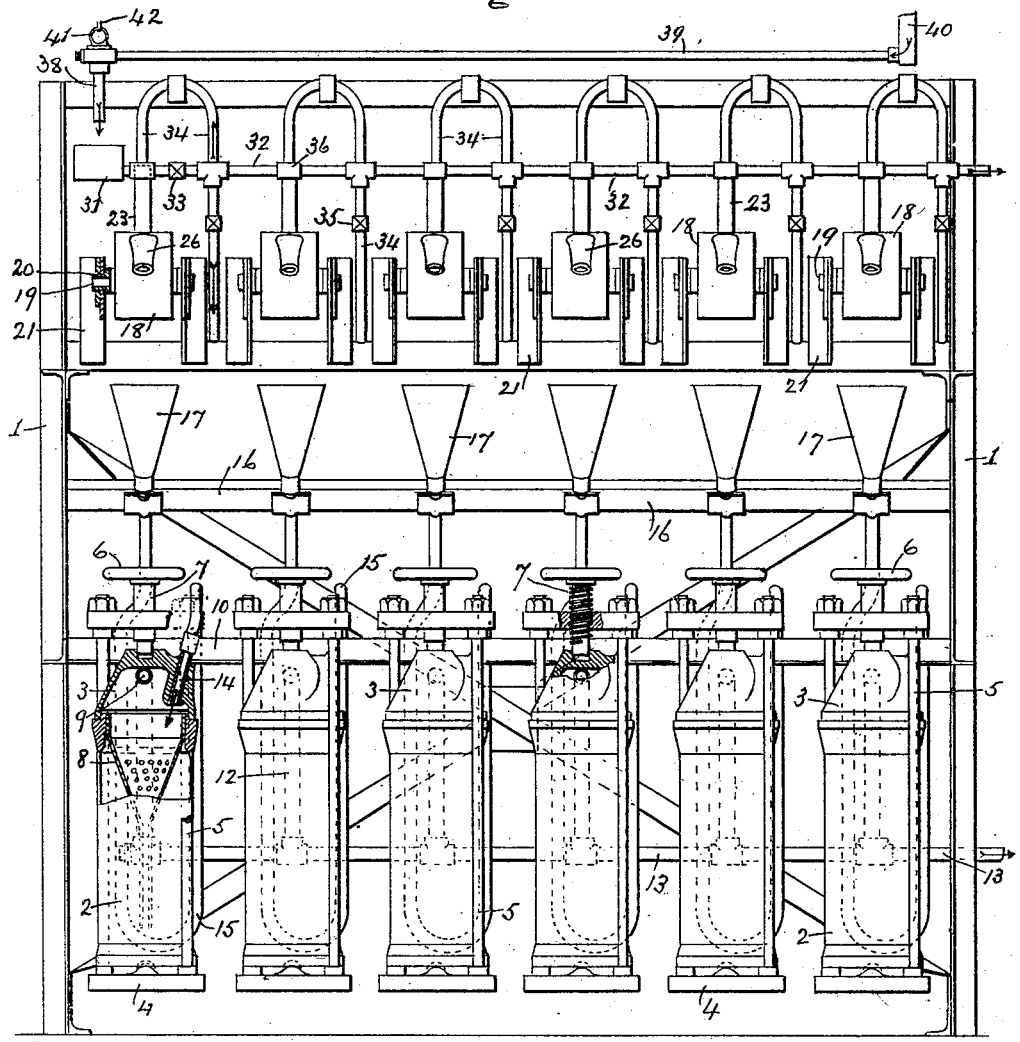

No. 868,425. PATENTED OCT. 15, 1907.
J. E. GOFFIN.
ACETYLENE GAS GENERATOR.
APPLICATION FILED DEC. 26, 1906.

2 SHEETS—SHEET 1.

WITNESSES;

INVENTOR,
JOSEPH EDMOND GOFFIN,
BY

ATTORNEY

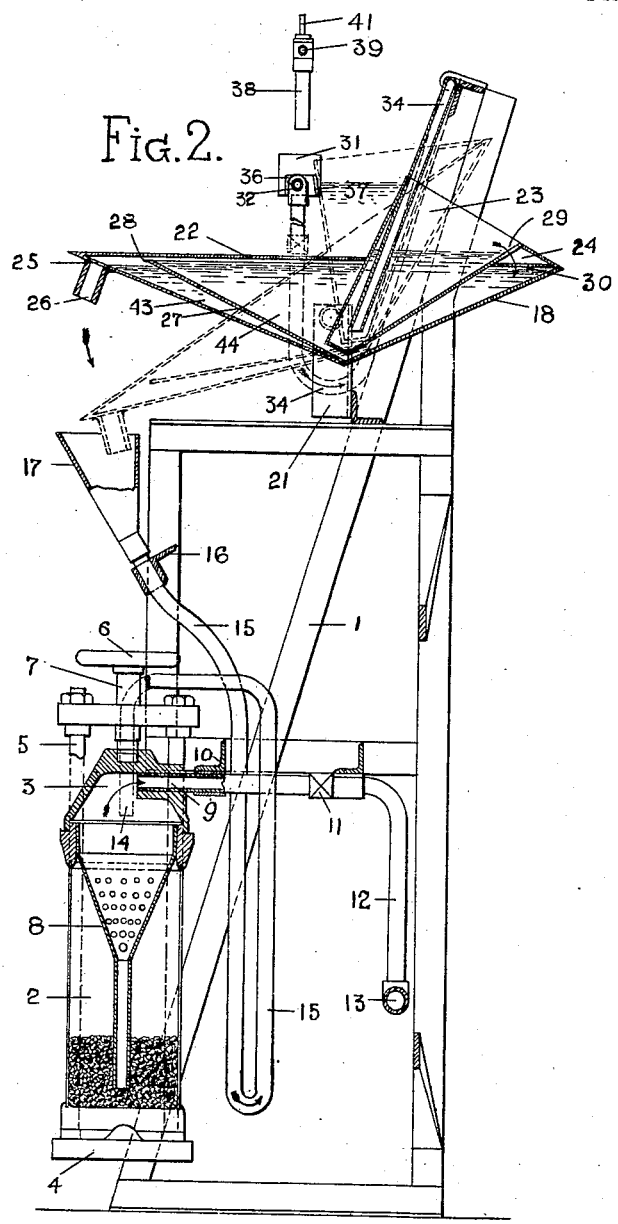

UNITED STATES PATENT OFFICE.

JOSEPH EDMOND GOFFIN, OF OUDENBOSCH, NETHERLANDS.

ACETYLENE-GAS GENERATOR.

No. 868,425.　　　　Specification of Letters Patent.　　　　Patented Oct. 15, 1907.

Application filed December 26, 1906. Serial No. 349,532.

*To all whom it may concern:*

Be it known that I, JOSEPH EDMOND GOFFIN, a subject of the Queen of the Netherlands, residing at Kaaistraat A 128, Oudenbosch, Province of Noord Brabant, Kingdom of the Netherlands, have invented certain new and useful Improvements in or Relating to Distributing Devices for Acetylene-Gas Generators and the Like, of which the following is a specification.

This invention relates to acetylene gas generators and has for its object to provide an improved automatic distributing device for generators in which several gas generating vessels are employed to each of which a definite amount of water is fed by a branch from a common supply pipe.

According to this invention the device comprises two or more hopper shaped tanks or troughs preferably formed of sheet iron arranged side by side and mounted in a rotatable manner, water being supplied to them from a common water distributing pipe by means of siphons. The method of mounting these tanks, which hereinafter are referred to as tipping tanks, is such that, when filled, their center of gravity is hydraulically shifted which results in their being tipped over, and the water contained in them discharged. After the tipping tank has been turned over by this hydraulic change of position of the center of gravity, it remains in that position and thus hydraulically shuts off further supply of water. The common water distributing pipe is arranged above the tipping tank and is supplied from a movably mounted main supply pipe, the level of which is regulated by the gas holder. All the tipping tanks are turned over one after another, after having been filled from the common water distributing pipe and their contents are discharged in regular succession.

The water distributing device according to this invention is preferably used in connection with acetylene generators of the type in which large quantities of water are to be supplied to relatively small quantities of carbid, and the supply of water is regulated by the volume of the gas generator already existing in the holder.

The acetylene generator comprises, as is well known, several interchangeable generator vessels arranged side by side, each of which has a water supply and a gas discharge pipe. All the gas discharge pipes merge into one pipe through which the gas is conveyed to a gas holder in the well known manner, after being passed through drying and purifying apparatus.

The individual water supply pipes for the generator vessels are arranged parallel to each other and provided at their upper ends with funnels for collecting the water which is automatically discharged, whereby the small given quantities of carbid contained in the generating vessels are completely immersed in succession and acetylene gas is generated in a uniform manner in sufficient quantities for the requirements.

A construction of the apparatus according to this invention is illustrated, by way of example, in the accompanying drawing, in which Figure 1 is a front elevation of the apparatus, some details being shown partly in section, and Fig. 2 is a vertical section through the apparatus.

On a frame 1 made of angle irons, are freely suspended several box-like generator vessels 2 which may be of a thin metal which is a good conductor and closed by means of conical covers 3.

The generators 2 are suspended from the covers 3 by means of a screw press device, comprising a bracket 4, two rods 5, hand wheel 6 and the screw spindle 7. A rubber ring placed between the cover and the edge of the generator vessel, but not shown in the drawing, insures a gas tight closing.

In the generator vessel 2 is mounted a perforated conical hopper 8 (Fig. 2) which is mounted freely upon the upper edge of the box the lower extremity of the hopper reaching close to the bottom of the vessel 2.

In the cover 3 of the vessel 2 is provided a gas discharge pipe 9 which is firmly secured to a transverse angle iron 10 of the frame, and so that the free suspension of the generator is not disturbed. Each gas discharge pipe 9 is provided with a valve 11 for the purpose of enabling each generating vessel to be cut off if desired. The pipes 9 are connected by means of a pipe 12 to a common gas pipe 13 which conveys the gas to the drying and purifying apparatus, and finally to the gas holder.

The cover 3 (Fig. 1) is provided laterally with a pipe 14 to which is connected a water supply pipe 15. The pipe 15 is bent twice at a right angle (Fig. 2) and at the bottom forms a bed which is connected above the generator, to the transverse member 16 of the frame and is provided at that point with a funnel 17 for the purpose of receiving water required for generating the gas.

The tipping tanks are arranged above the generator vessels and comprise completely closed triangular prismatic sheet metal boxes 18 (Fig. 2) the lateral walls of which, through which passes a spindle or pin, are made of such dimensions as to form approximately isosceles triangles, the bases of which are horizontal. Each tank 18 is rotatably mounted on trunnions 19 which rest in bearings 20 formed in standards 21 (Fig. 1). In the upper closing plate 22 of the tank 18 is placed a second prismatic sheet metal box or tank 23 hereinafter referred to as the "inlet bucket" open at the top. The width of the inlet bucket is about one-third of that of the box 18. The inlet bucket 23 is secured only to the closing plate 22. As already stated, the inlet bucket 23 is quite open at the top. The portion of the lateral walls of the inlet bucket, as far as the same is situated above the closing plate 22 is extended towards the right, up to the extreme right hand point of the tipping tank 18, and the space or chamber 24 formed in that manner, (Fig. 2) is closed at the top.

The tipping tank 18 is provided at the left hand side with an outlet opening 25 having a mouth piece or spout 26 (Fig. 2). The tipping tank is divided by means of a wall 27 which is inserted in such manner as to leave at the top near the closing plate, a small passage 28. The partition 27 forms with the left hand wall of the tipping tank a small overbalancing space 43 (Fig. 2) which, in this apparatus, has a special significance as will be hereinafter explained. After deducting the space 43, the remaining space 44 of the tipping tank 18 constitutes the tank proper which has its opposite walls of equal dimensions those at the sides being triangular and those at the ends rectangular.

The inlet bucket 23 is provided at the top with an outlet opening 29 which opens into the space 24, and from that space an outlet opening 30 leads into the interior of the tipping tank proper 18.

The supply of water to the tank 18 is effected in the following manner. Above the whole width of the apparatus is arranged a water distributing pipe 32 which is provided at the left hand side (Fig. 1) with an inlet funnel 31, and at the other end with a discharge opening. To this pipe are connected, laterally of each tipping tank 18, supply pipes 34 with double bends so that each pipe forms a siphon between the pipe 32 and the tipping tank 18. The end of the siphon 34 opens close above the bottom of the inlet bucket 23 and is arranged in such manner that the said opening remains free from the bottom and the lateral walls of the inlet bucket in either of the two positions of the tipping tank. In the horizontal position, the tipping tank rests with the front edge of the inlet bucket on the siphon 34 (Fig. 2) and in the oblique position the said edge rests on the pipe 32. In order to provide an elastic abutment on this pipe during the tipping, it is provided with a block 36 with a rubber buffer 37. The pipe 32 can be closed at a point next to the inlet funnel 31 by means of a valve 33, and each siphon 34 is also provided with a valve or stop cock 35. Water is admitted through the pipe 39 from the tank 40 (Fig. 1) to which is connected the fixed end of the movable pipe 39. To the movable end of the pipes 39 a discharge branch 38 is provided above the inlet funnel 31. The supply of water from the tank 40 can be interrupted by suitable means when the free end of the main supply pipe 39 has been raised to a given level. This is effected by the said end being suspended by a ring 41 to a chain 42 which transmits the up and down movement of the acetylene gas holder direct to the pipe 39.

The working of the apparatus is as follows:—After the gas holder has descended owing to the decrease of the volume of the gas pressure within it the left hand portion of the main supply pipe 39 also sinks down, and comes into the position shown in Fig. 1. Water flows from the water tank 40 through the pipe 39 into the funnel 31. The siphons 34 are first completely, and the inlet buckets 23 only partly, filled with water, the tipping tanks being all arranged in horizontal position. Water from the water distributing pipe 32 flows then first into the first siphon 34. The diameter of this siphon pipe is equal to that of the common pipe 32, and both are made very large compared to the supply pipe 39. All water supplied through the pipe 32, will therefore escape through the first orifice of the first siphon 34 it meets, without passing any further into the pipe 32, so that no water will ever reach the next tipping tank, as long as the previous one has not been filled or emptied after filling. Water from the siphon 34 flows into the inlet bucket 23 and gradually rises up to the outlet opening 29 (Fig. 2) flows over the same and passes through the opening 30 into the inner space 44 of the tipping tank proper. During this process, the tipping tank remains in the horizontal position shown in Fig. 2 in full lines. The space 44 is gradually filled, until water reaches the upper edges of the partition 27. Any air contained therein, either escapes through the openings 30 and 29, or for the greater part, through the space 28 and the outlet opening 25. Water passes then into the overbalancing space 43 and gradually fills it.

As already stated, the lateral walls of the tank proper are practically of equal dimensions. Owing to this, the tipping tank will remain horizontal even when the space 44 is completely filled with water. As soon, however, as the water in the space 43 has risen close to the opening 25, the equilibrium will be destroyed, the tipping tank will turn about the pin 19, come into the position shown dotted in Fig. 2 and discharge its contents very quickly into the funnel 17. As will be seen, the space 43 serves only for turning over the filled tipping tank and for allowing itself to be discharged into the funnel 17. Water escaping from the spout 26, owing to its being turned over, flows then into the funnel 17 and into the bent pipe 15, which has been preferably filled with water before or still contains some water from the previous operation. The whole quantity of water rushes through the said pipe into the hopper or funnel 8, passes at the bottom into the generator 2, and owing to its volume being say three times that of the carbid in a few seconds completely immerses the latter. The gas generated collects at the top in the tank 2, escapes through the openings in the funnel 8 into the cover, and thence through the pipes 9 and 12 and the gas pipe 13 into the drying and purifying apparatus, and finally into the gas holder. While the tipping tank empties its contents into the funnel 17, the supply of water still continues. The water will then rise in the inlet bucket 23 which occupies the position shown in dotted lines in Fig. 2 and finally would escape again through the opening 29. The position of the opening 29 is, however, such that in the vertical position of the inlet bucket, the bottom edge of the same is above the distributing pipe 32. In this way, the water in the inlet bucket balances the water in the siphon 34 and in the distributing pipe 32 so that further supply of water to the first tipping tank is therefore stopped. The water flows then to the second tipping tank. Naturally, owing to the turning over of the first tipping tank, a stronger gas generation takes place. As the consumption of the gas does not keep place at that moment with the generation, the gas thus quickly generated, raises the gas holder and therefore the pipe 39, whereby the discharge of water is stopped.

It has been found in practice that in an installation arranged as described, the gas holder and therefore the pipe 39, has been raised, one minute after the turning over of the tipping tank 18, to such an extent that the supply of water was stopped.

As soon as the gas holder sinks again, the whole operation is repeated in the second tipping tank. The filling of the same again causes a hydraulic displacement of the center of gravity, and after it has been turned over, the supply of water to the same is again hydraulically closed as already stated. When using this peculiar water supply, it is essential that, before starting to work, all the tipping tanks should be placed horizontally, the siphons 34 completely filled and the inlet buckets 23 partly filled with water. In order to fill the siphons, the valve 33 next to the inlet funnel 31 and all the valves 35 are closed. The distributing pipe 32 is thereupon connected at its discharge opening by means of an elastic pipe or in any other suitable way with a tank from which the water flows under pressure into the distributing pipe. As soon as a stop valve 35 is opened, the water enters the corresponding siphon pipe which it fills together with the corresponding inlet bucket and as soon as the water has reached the outlet opening 29 the valve 35 is closed and the waterflow is led to the next siphon until all the siphons and inlet buckets of the battery are filled. The pipes 15 are also first filled with water, in order to form in that way a hydraulic seal for the gas generator.

The position of the center of gravity of the tipping tank relatively to its center of oscillation is selected in such manner that, in the overturned or oblique position, the weight of the water in the inlet bucket is not sufficient to cause the tipping tank to fall back. The tipping tank must therefore be brought again into working position by hand.

The chief advantages of this invention consist in the possibility of working the apparatus for a long time without any attendance and re-filling the period of time being limited only by the number of tipping tanks.

As soon as all the carbid in the single generating vessels has been used up, they are detached from their covers 3 by unscrewing the screw spindle 7, lifted out from the bracket 4, emptied, filled with a new charge of carbid and again put in. This can be done with several of the generating vessels while the others are still working, if the corresponding valves 11 of the gas pipes have been first closed.

Another advantage of the apparatus is that when one of the generating vessels or of the corresponding pipes etc. gets out of order, the said part of the battery can be cut out simply by turning over the corresponding tipping tank by hand. It comes then into the position shown dotted in Fig. 2, in which, as already stated, the supply of water to the said tank ceases, and passes to the next tipping tank, as soon as the water in the corresponding inlet bucket has reached the opening 29.

It will be understood that the details of construction may be varied without departing from this invention.

Having thus described the nature of my invention and the best means I know of carrying the same into practical effect I declare that what I claim is:

1. In an acetylene gas generator, the combination of a plurality of gas-generating vessels, a plurality of pivotally mounted hopper-shaped tipping tanks, each of which is divided into three compartments, namely an inlet bucket, the tank proper and an overbalancing space, a water supply pipe, means for controlling the flow of water in this pipe, a plurality of branch pipes each leading from the water supply pipe to a tipping tank, and openings in the walls of the compartments of each tank through which the water can pass from the inlet bucket to the tank proper, from the tank proper to the overbalancing space and thence into the corresponding gas-generating vessel, as set forth.

2. In an acetylene gas generator, the combination of a plurality of gas generating vessels, a plurality of pivotally mounted hopper-shaped tipping tanks, each of which is divided into three compartments, namely an inlet bucket, having an open top, the tank proper having a closed top, and an overbalancing space also closed at the top, a water supply pipe, means for controlling the flow of water in this pipe, a plurality of branch pipes each leading from the water supply pipe to a tipping tank, and openings in the walls of the compartments of each tank through which the water can pass from the inlet bucket to the tank proper, from the tank proper to the overbalancing space and thence into the corresponding gas-generating vessel, as set forth.

3. In an acetylene gas generator, the combination of a plurality of gas-generating vessels, a plurality of pivotally mounted hopper-shaped tipping tanks, each of which is divided into three compartments, namely an inlet bucket, having an open top, the tank proper having rectangular and triangular walls the opposite walls being of equal dimensions and having a closed top, and an overbalancing space also closed at the top, a water supply pipe, means for controlling the flow of water in this pipe, a plurality of branch pipes each leading from the water supply pipe to a tipping tank, and openings in the walls of the compartments of each tank through which the water can pass from the inlet bucket to the tank proper, from the tank proper to the overbalancing space and thence into the corresponding gas-generating vessel, as set forth.

4. In an acetylene gas generator, the combination of a plurality of gas-generating vessels, a plurality of pivotally mounted hopper-shaped tipping tanks, each of which is divided into three compartments, namely an inlet bucket, the tank proper and an overbalancing space, a water supply pipe, means for controlling the flow of water in this pipe, a main distributing pipe in communication with the supply pipe, a plurality of siphons each leading from the distributing portion of the supply pipe to the inlet bucket of a tipping tank, and openings in the walls of compartments of each tank through which the water can pass from the inlet bucket to the tank proper, from the tank proper to the overbalancing space and thence into the corresponding gas-generating vessel, as set forth.

5. In an acetylene gas generator the combination of a plurality of gas-generating vessels, a plurality of pivotally mounted hopper-shaped tipping tanks, each of which is divided into three compartments, namely an inlet bucket, having an open top, the tank proper having rectangular and triangular walls the opposite walls being of equal dimensions and a closed top, and an over-balancing space also closed at the top, a water supply pipe, means for controlling the flow of water in this pipe, a main distributing pipe in communication with the supply pipe, a plurality of siphons each leading from the distributing portion of the supply pipe to the inlet bucket of a tipping tank, and openings in the walls of the compartments of each tank through which the water can pass from the inlet bucket to the tank proper, from the tank proper to the overbalancing space and thence into the corresponding gas-generating vessel, as set forth.

6. In an acetylene gas generator, the combination of a plurality of gas-generating vessels, a plurality of pivotally mounted hopper-shaped tipping tanks, each of which is divided into three compartments, namely an inlet bucket, the tank proper and an over-balancing space, a water supply pipe comprising a fixed distributing portion and a movable portion, the fixed portion having an open end into which water is delivered from the open end of the movable portion, a plurality of siphons leading from the water supply pipe to a tipping tank, and openings in the walls, of the compartments of each tank through which the water can pass from the inlet bucket to the tank proper, from the tank proper to the overbalancing space and thence into the corresponding gas-generating vessel, as set forth.

7. In an acetylene gas generator, the combination of a plurality of gas-generating vessels, a plurality of pivotally mounted hopper-shaped tipping tanks each of which is divided into three compartments, namely an inlet bucket, the tank proper and an overbalancing space, a water supply pipe comprising a fixed distributing portion and a movable portion, the fixed portion having an open end into which water is delivered from the open end of the movable portion, a plurality of siphons each leading from the fixed portion of the water supply pipe to a tipping tank, and openings in the walls of the compartments of each tank through which the water can pass from the inlet bucket to the tank proper, from the tank proper to the overbalancing space and thence into the corresponding gas-generating vessel, the opening in the wall of the inlet bucket being so positioned that when the tank is tipped the said opening is on a level with the open end of the main distributing pipe, as set forth.

8. In an acetylene gas generator, the combination of a plurality of gas-generating vessels, a plurality of pivotally mounted hopper-shaped tipping tanks each of which is divided into three compartments, namely an inlet bucket, having an open top, the tank proper having a closed top, and an overbalancing space also closed at the top, a water supply pipe comprising a fixed distributing portion and a movable portion, the fixed portion having an open end into which water is delivered from the open end of the movable portion, a plurality of siphons each leading from the fixed portion of the water supply pipe to a tipping tank, and openings in the walls of the compartments of each tank through which the water can pass from the inlet bucket to the tank proper, from the tank proper to the overbalancing space and thence to the corresponding gas-generating vessel, as set forth.

9. In an acetylene gas generator, the combination of a plurality of gas-generating vessels, a plurality of pivotally mounted hopper-shaped tipping tanks each of which is divided into three compartments, namely an inlet bucket, having an open top, the tank proper having a closed top, and an overhanging space also closed at the top, a water supply pipe comprising a fixed distributing portion and a movable portion, the fixed portion having an open end into which water is delivered from the open end of the movable portion, a plurality of siphons each leading from the fixed portion of the water supply pipe to a tipping tank, and openings in the walls of the compartment of each tank through which the water can pass from the inlet bucket to the tank proper, from the tank proper to the overbalancing space and thence to the corresponding gas-generating vessel, the opening in the wall of the inlet bucket being so positioned that when the tank is tipped the said opening is on a level with the open end of the main distributing pipe, as set forth.

10. In an acetylene gas generator, the combination of a plurality of gas-generating vessels, a plurality of pivotally mounted hopper-shaped tipping tanks each of which is divided into three compartments, namely an inlet bucket having an open top, the tank proper having rectangular and triangular walls the opposite walls being of equal dimensions and a closed top, and an overbalancing space also closed at the top, a water supply pipe comprising a fixed distributing portion and a movable portion, the fixed portion having an open end into which water is delivered from the open end of the movable portion, a plurality of siphons each leading from the fixed portion of the water supply pipe to a tipping tank, and openings in the walls of the compartments of each tank through which the water can pass from the inlet bucket to the tank proper, from the tank proper to the overbalancing space and thence into the open end of a pipe communicating with the corresponding gas-generator, the opening in the wall of the inlet bucket being so positioned that when the tank is tipped the said opening is on a level with the open end of the main distributing pipe, as set forth.

In testimony whereof I have hereunto set my hand in presence of two subscribing witnesses.

JOSEPH EDMOND GOFFIN.

Witnesses:
AUGUST F. W. HAACK,
JOSEPH AUGUST MINGELS.